US009008355B2

(12) United States Patent
Markovic et al.

(10) Patent No.: US 9,008,355 B2
(45) Date of Patent: Apr. 14, 2015

(54) AUTOMATIC DEPTH CAMERA AIMING

(75) Inventors: Relja Markovic, Seattle, WA (US);
Stephen Latta, Seattle, WA (US);
Kyungsuk David Lee, Seattle, WA (US);
Oscar Omar Garza Santos, Seattle, WA (US); Kevin Geisner, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 12/794,388

(22) Filed: Jun. 4, 2010

(65) Prior Publication Data
US 2011/0299728 A1 Dec. 8, 2011

(51) Int. Cl.
G06K 9/00 (2006.01)
G06T 7/00 (2006.01)
G01S 3/786 (2006.01)
H04N 13/02 (2006.01)

(52) U.S. Cl.
CPC ..... G06T 7/0042 (2013.01); G06T 2207/10028 (2013.01); G01S 3/786 (2013.01); H04N 13/0271 (2013.01); A63F 2300/1087 (2013.01); A63F 2300/8029 (2013.01)

(58) Field of Classification Search
USPC .......................... 382/103, 106–107, 172, 189
See application file for complete search history.

(56) References Cited

U.S. PATENT DOCUMENTS

| 4,288,078 A | 9/1981 | Lugo |
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |

(Continued)

FOREIGN PATENT DOCUMENTS

| CN | 101068342 A | 11/2007 |
| CN | 101359151 A | 2/2009 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Matthew Bella
*Assistant Examiner* — Weiwen Yang
(74) *Attorney, Agent, or Firm* — Gregg Wisdom; Judy Yee; Micky Minhas

(57) ABSTRACT

Automatic depth camera aiming is provided by a method which includes receiving from the depth camera one or more observed depth images of a scene. The method further includes, if a point of interest of a target is found within the scene, determining if the point of interest is within a far range relative to the depth camera. The method further includes, if the point of interest of the target is within the far range, operating the depth camera with a far logic, or if the point of interest of the target is not within the far range, operating the depth camera with a near logic.

19 Claims, 8 Drawing Sheets

(56) References Cited

U.S. PATENT DOCUMENTS

| | | |
|---|---|---|
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,340,114 B1 * | 1/2002 | Correa et al. ............ 235/462.22 |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,519,359 B1 * | 2/2003 | Nafis et al. .................... 382/154 |
| 6,539,931 B2 | 4/2003 | Trajkovic et al. |
| 6,570,555 B1 | 5/2003 | Prevost et al. |
| 6,580,563 B1 | 6/2003 | Finney |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,798,406 B1 * | 9/2004 | Jones et al. .................... 345/419 |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,940,891 B2 * | 9/2005 | Clary et al. .................... 372/107 |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 * | 5/2008 | Fujimura et al. .............. 382/103 |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |

(56) References Cited

U.S. PATENT DOCUMENTS

| | | | |
|---|---|---|---|
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2005/0058337 A1 | 3/2005 | Fujimura et al. | |
| 2005/0059488 A1* | 3/2005 | Larsen et al. | 463/36 |
| 2006/0259574 A1* | 11/2006 | Rosenberg | 709/217 |
| 2006/0277571 A1* | 12/2006 | Marks et al. | 725/37 |
| 2007/0036427 A1* | 2/2007 | Nakamura et al. | 382/154 |
| 2007/0189750 A1 | 8/2007 | Wong et al. | |
| 2007/0190494 A1* | 8/2007 | Rosenberg | 434/11 |
| 2008/0007626 A1* | 1/2008 | Wernersson | 348/211.9 |
| 2008/0026838 A1 | 1/2008 | Dunstan et al. | |
| 2008/0263592 A1 | 10/2008 | Kimber et al. | |
| 2009/0059037 A1* | 3/2009 | Naick et al. | 348/231.99 |
| 2009/0315915 A1 | 12/2009 | Dunn et al. | |
| 2010/0025566 A1* | 2/2010 | Hargrove et al. | 250/201.2 |
| 2010/0085351 A1* | 4/2010 | Deb et al. | 345/419 |
| 2010/0128145 A1* | 5/2010 | Pitts et al. | 348/231.99 |
| 2011/0211754 A1* | 9/2011 | Litvak et al. | 382/165 |

FOREIGN PATENT DOCUMENTS

| | | |
|---|---|---|
| CN | 201254344 B | 6/2010 |
| EP | 0583061 A2 | 2/1994 |
| JP | 08044490 A1 | 2/1996 |
| JP | 2008289004 A * | 11/2008 |
| WO | 93/10708 A1 | 6/1993 |
| WO | 97/17598 A1 | 5/1997 |
| WO | 99/44698 A1 | 9/1999 |
| WO | 2008014826 A1 | 2/2008 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Wu, Chen and Hamid Aghajan, "Human Pose Estimation in Vision Sensor Networks via Distributed Local Processing and Nonparametric Belief Propagation," Stanford University, Stanford, CA, USA, Advanced Concepts for Intelligent Vision Systems 2008: 1006-1017, 13 pages.

Nishiwaki Koichi et al., "Mixed Reality Environment for Autonomous Robot Development," 2008 IEEE International Conference on Robotics and Automation, Pasadena, CA, USA, May 19-23, 2008, 2 pages.

Rosselot, Donald, "Processing real-time stereo video in disparity space for obstacle mapping," Thesis submitted to the Division of Graduate Studies and Advanced Research of the University of Cincinnati, Cincinnati, OH, USA, 2005, 66 pages.

Taylor, Trevor et al., Using Camera Tilt to Assist with Localisation. In Proceedings 3rd International Conference on Autonomous Robots and Agents (ICARA), Accessed from <http://eprints.qut,.edu.au>, Palmerston North, New Zealand, 2006, 7 pages.

Berendsen, Berend et al., "Volumetric Modeling of 3D Human Pose from Multiple Video," Department of Mediamatics, Delft University of Technology, The Netherlands, Proceedings of the SAMT Workshop on Semantic 3D Media 2008, 8 pages.

(56) References Cited

OTHER PUBLICATIONS

The State Intellectual Property Office of the People's Republic of China, Notice on the First Office Action of Chinese Patent Application No. 201110159935.0, Mar. 1, 2013, 10 pages.

State Intellectual Property Office of the People's Republic of China, Second Office Action for CN201110159935.0, Oct. 15, 2013, 13 Pages.

State Intellectual Property Office of the People's Republic of China, Notice of Allowance for CN201110159935.0, Apr. 18, 2014, 6 Pages.

* cited by examiner

AUTOMATIC DEPTH CAMERA AIMING

BACKGROUND

Depth cameras may be utilized to capture depth information as well as additional information such as brightness, color, etc. for a matrix of pixels. Such information may then be utilized to model targets that are present in a viewed scene.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of the disclosure, a method of automatically aiming a depth camera at a point of interest is provided. The method includes receiving from the depth camera one or more observed depth images of a scene. The method further includes, if a point of interest of a target is found within the scene, determining if the point of interest is within a far range relative to the depth camera. The method further includes, if the point of interest of the target is within the far range, operating the depth camera with a far logic, or if the point of interest of the target is not within the far range, operating the depth camera with a near logic.

DETAILED DESCRIPTION

Figure 1A:
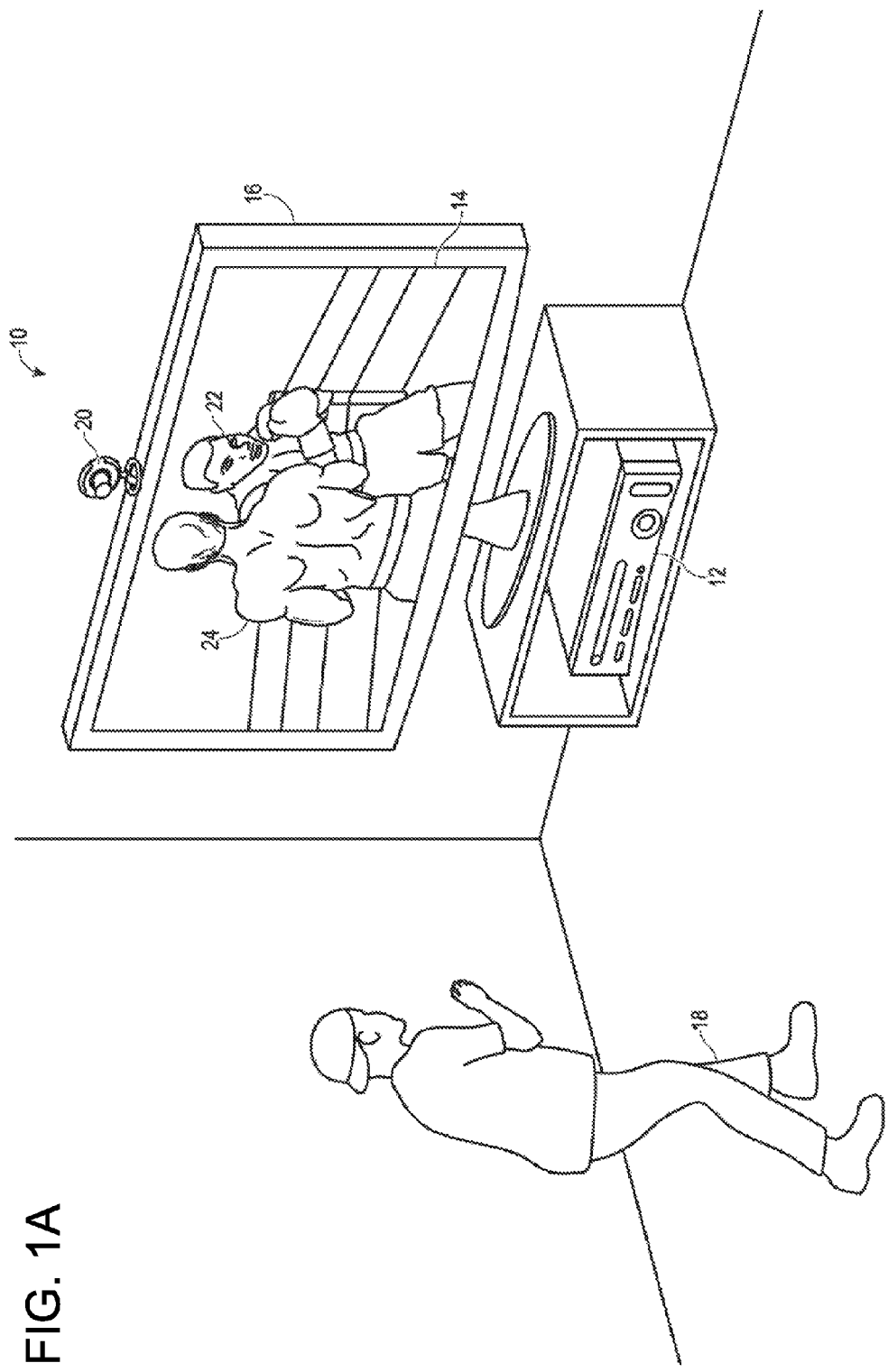
FIG. 1A shows an example embodiment of a computing system including a depth camera tracking a game player playing a boxing game.

FIG. 1A shows a nonlimiting example of a target tracking system 10. In particular, FIG. 1A shows a computer gaming system 12 that may be used to play a variety of different games, play one or more different media types, and/or control or manipulate non-game applications. FIG. 1A also shows a display 14 in the form of a high-definition television, or HDTV 16, which may be used to present game visuals to game players, such as game player 18. Furthermore, FIG. 1A shows a capture device in the form of a depth camera 20, which may be used to visually monitor one or more game players, such as game player 18. The example shown in FIG. 1A is nonlimiting. As described below with reference to FIG. 11, a variety of different types of target tracking systems may be used without departing from the scope of this disclosure.

A target tracking system may be used to recognize, analyze, and/or track one or more targets, such as game player 18. FIG. 1A shows a scenario in which game player 18 is tracked using depth camera 20 so that the movements of game player 18 may be interpreted by gaming system 12 as controls that can be used to affect the game being executed by gaming system 12. In other words, game player 18 may use his movements to control the game. The movements of game player 18 may be interpreted as virtually any type of game control.

Figure 1B:
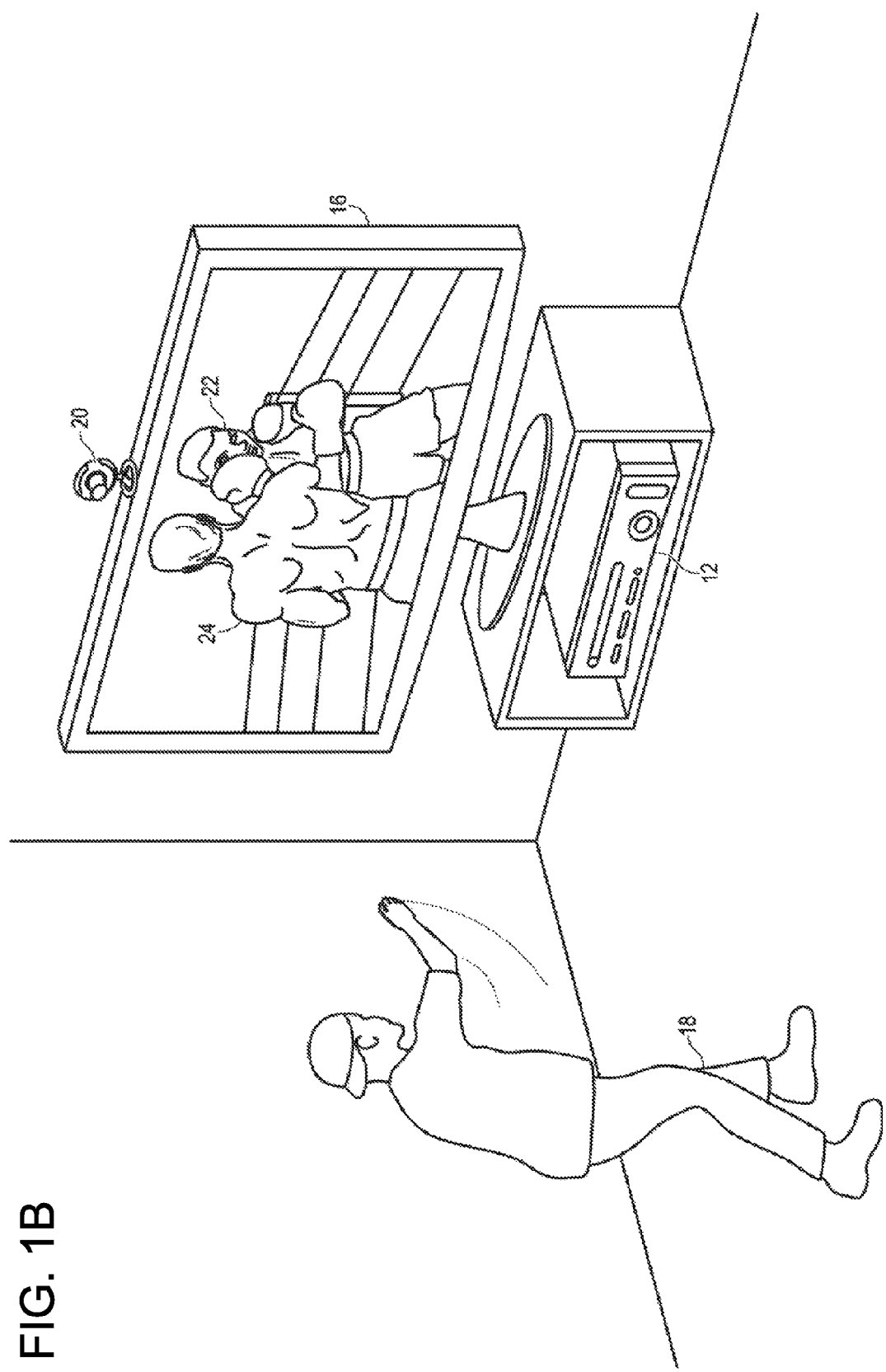
FIG. 1B shows the game player of FIG. 1A throwing a punch that is tracked and interpreted as a game control that causes a player avatar to throw a punch in a game space of the boxing game.

The example scenario illustrated in FIG. 1A shows game player 18 playing a boxing game that is being executed by gaming system 12. The gaming system uses HDTV 16 to visually present a boxing opponent 22 to game player 18. Furthermore, the gaming system uses HDTV 16 to visually present a player avatar 24 that game player 18 controls with his movements. As shown in FIG. 1B, game player 18 can throw a punch in physical/world space as an instruction for player avatar 24 to throw a punch in game/virtual space. Gaming system 12 and depth camera 20 can be used to recognize and analyze the punch of game player 18 in physical space so that the punch can be interpreted as a game control that causes player avatar 24 to throw a punch in game space. For example, FIG. 1B shows HDTV 16 visually presenting player avatar 24 throwing a punch that strikes boxing opponent 22 responsive to game player 18 throwing a punch in physical space.

Other movements by game player 18 may be interpreted as other controls, such as controls to bob, weave, shuffle, block, jab, or throw a variety of different power punches. Furthermore, some movements may be interpreted into controls that serve purposes other than controlling player avatar 24. For example, the player may use movements to end, pause, or save a game, select a level, view high scores, communicate with a friend, etc.

Target tracking systems may be used to interpret target movements as operating system and/or application controls that are outside the realm of gaming. Virtually any controllable aspect of an operating system and/or application, such as the boxing game shown in FIGS. 1A and 1B, may be controlled by movements of a target, such as game player 18. The illustrated boxing scenario is provided as an example, but is not meant to be limiting in any way. To the contrary, the illustrated scenario is intended to demonstrate a general concept, which may be applied to a variety of different applications without departing from the scope of this disclosure.

Gaming system 12, or another suitable computing device, may be configured to represent one or more targets observed via the depth camera with a model. The model may be represented by one or more polygonal meshes, by a set of mathematical primitives, by a skeletal model including a plurality of joint locations, and/or via other suitable machine representations of the modeled target.

In some scenarios, one or more aspects of a target may be of particular interest to a target tracking system. As one non-limiting example, the head of a player target may be of particular interest in some scenarios. Such aspects of a target that are of particular interest may be referred to as points of interest of the target. Such points of interest may be particular body parts of a player target, a particular item or prop, or virtually any other aspect that is viewable within a scene. Such points of interest may be modeled, as introduced above. For example, a head of a player target may be modeled via a machine representation of the head (e.g., a polygonal mesh, a skeletal member, a data structure indicating a position and volume, etc.).

A point of interest can be variously positioned based on a variety of different characteristics of a particular target. For example, continuing with the example introduced above, the head of a player target can be at different positions depending on the height of the player target. Furthermore, the head of a player target can be at different angles relative to a depth camera depending on the height of the head, the height of the depth camera, and/or how far the player target is standing away from the depth camera.

Figure 2:
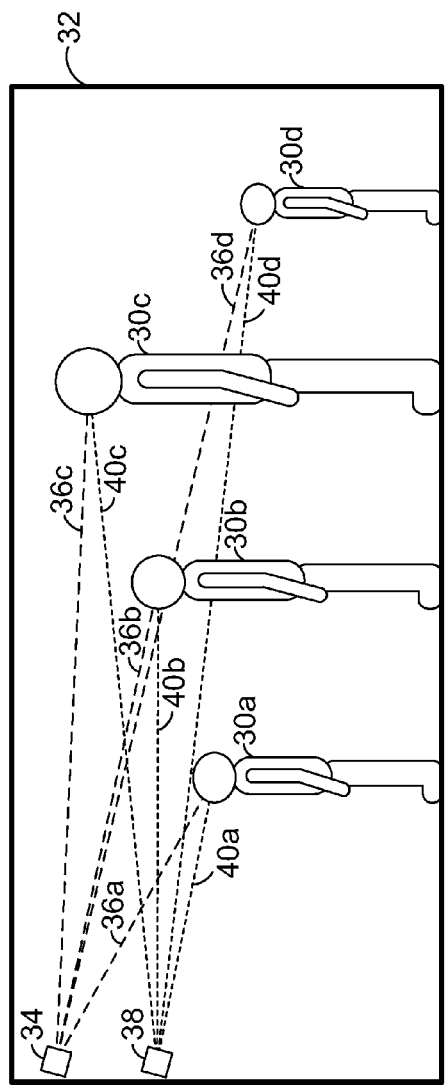
FIG. 2 schematically shows an example of player targets being tracked by depth cameras positioned at different heights.

FIG. 2 somewhat schematically shows four player targets 30a, 30b, 30c, and 30d in a room 32 with a depth camera 34. FIG. 2 also shows exemplary aiming vectors 36a, 36b, 36c, and 36d that aim depth camera 34 directly at the heads of player targets 30a, 30b, 30c, and 30d, respectively. FIG. 2 also shows a depth camera 38 at an alternative height, and the aiming vectors 40a, 40b, 40c, and 40d that aim depth camera 38 directly at the heads of player targets 30a, 30b, 30c, and 30d, respectively. As can be seen, the aiming vectors vary with the height and the fore/aft positioning of the point of interest (e.g., head of player target), and the height of the depth camera.

Figure 3:
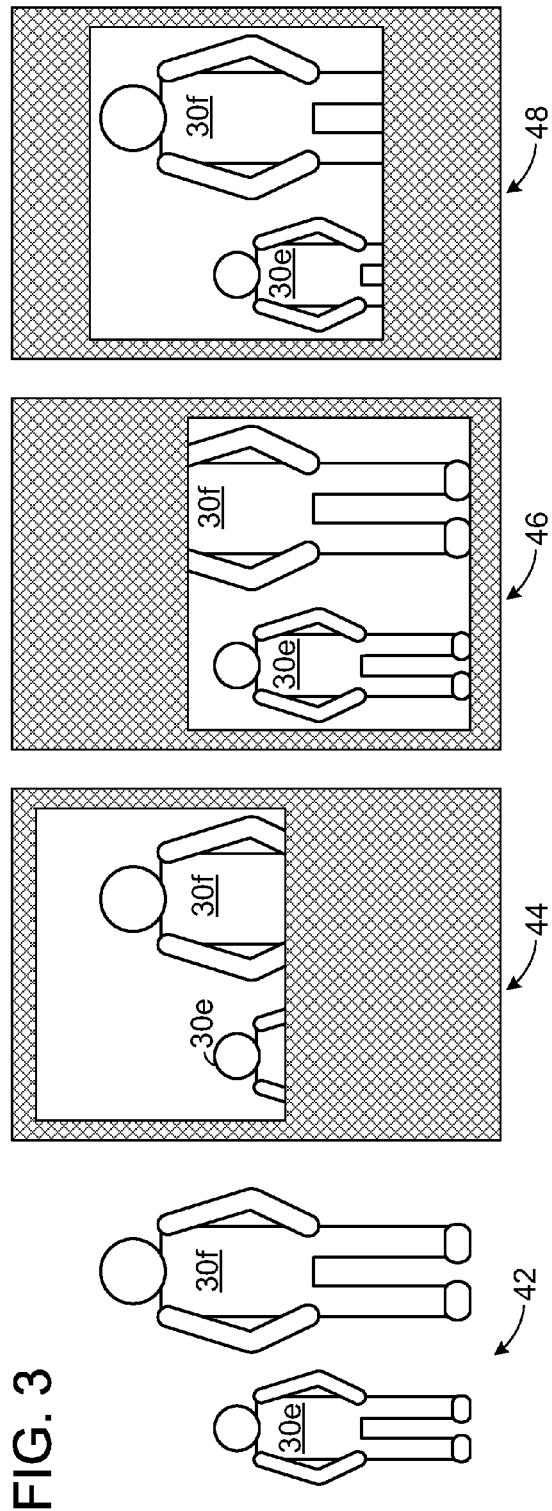
FIG. 3 schematically shows various example views of a depth camera at different aiming vectors.

A point of interest of a player target may not be within the field of view of a depth camera depending on where the depth camera is aimed. To illustrate this concept, FIG. 3 somewhat schematically shows a child player target 30e and an adult player target 30f. In particular, FIG. 3 shows a full-view 42 of child player target 30e and adult player target 30f in which both player targets are fully visible. A depth camera may achieve such a full-view if the depth camera has a wide field of view and/or the player targets are standing relatively far away from the depth camera. FIG. 3 also shows a high-view 44 in which the depth camera is pointed on a relatively high aiming vector. FIG. 3 also shows a low-view 46 in which the depth camera is pointed on a relatively low aiming vector. Further, FIG. 3 shows a mid-view 48 in which the depth camera is pointed on an intermediate aiming vector.

As can be seen in the high-view 44, low-view 46, and mid-view 48 of FIG. 3, depending on the aiming vector, large portions of the player targets may be out of the field of view of the depth camera. Further, as can be appreciated when considering FIG. 2, a particular aiming vector will allow a depth camera to view different portions of a target depending on the fore/aft positioning of the target and/or the height of the depth camera. As such, the aiming vector of a depth camera can be changed in order to bring a point of interest (e.g., the head of a player target) into the field of view of a depth camera.

Figure 4:
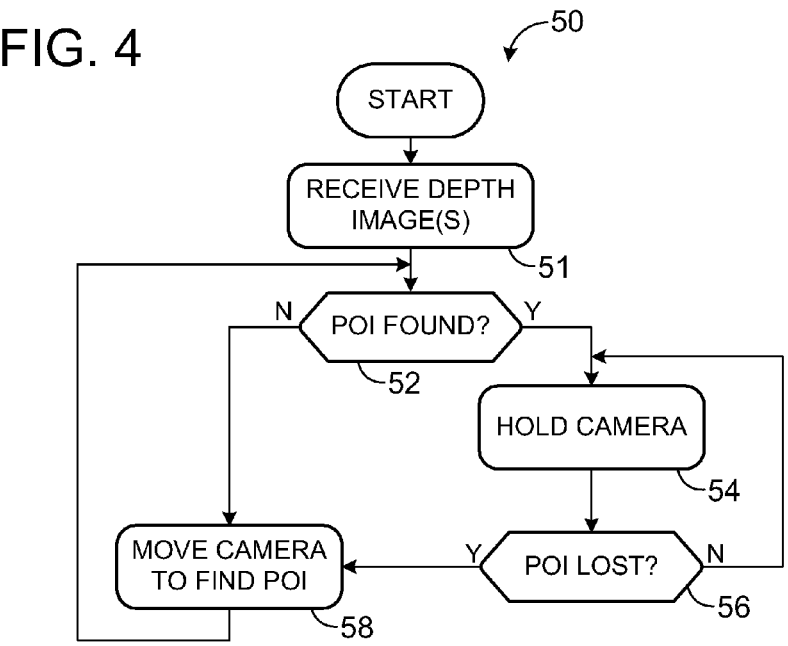
FIG. 4 shows a flow diagram of an example method of automatically aiming a depth camera at a point of interest.

FIG. 4 shows a method 50 of automatically aiming a depth camera at a point of interest. In some embodiments, method 50 may be carried out by a computing system, such as tracking system 10 of FIG. 1. At 51, method 50 includes receiving from a depth camera one or more observed depth images of a scene. For example, gaming system 12 of FIG. 1 may receive one or more depth images from depth camera 20 of FIG. 1.

At 52, method 50 includes determining if a point of interest (POI) of a target is found within the scene. As an example, the point of interest may be a head of a target game player. In such a scenario, gaming system 12 of FIG. 1, or another suitable device, may analyze the scene and model one or more target game players within the scene to determine if a head is within view.

At 54, if a point of interest of a target is found within the scene, method 50 includes holding an aiming vector of the depth camera. In other words, if the point of interest is already within the field of view, method 50 may avoid unnecessary depth camera movements by maintaining a current aiming vector. Holding the depth camera so that the aiming vector does not move may include refraining from sending "move" instructions to the depth camera and/or an aiming assembly configured to selectively change an aiming vector of the depth camera.

At 56, method 50 includes determining if the point of interest has been lost. In some embodiments, determining if the point of interest is lost includes determining if the point of interest is near a center of the field of view and/or within an edge of the field of view by at least a predetermined tolerance. If the point of interest is not near the center and/or is deemed to be too close to an edge, the point of interest is considered lost and the aiming vector of the depth camera may be nudged so as to move the point of interest closer to a center of the field of view. However, in some embodiments, the depth camera will hold an aiming vector until a point of interest leaves the field of view. If the point of interest is not lost, method 50 may continue to hold the depth camera at 54 and monitor the point of interest at 56.

At 58, method 50 includes moving the aiming vector of the depth camera if the point of interest of the target is not found within the scene at 52 and/or if the point of interest is lost at 56. As explained below, the logic for moving a depth camera may vary depending on one or more factors. As an example, depth camera aiming may be handled differently depending on if a target is within a near range, relatively close to a depth camera (e.g., player target 30a in FIG. 2), or a far range, relatively farther away from the depth camera (e.g., player target 30d in FIG. 2). Example logic for aiming the depth camera depending on whether a target is in a near range or a far range is provided below with reference to FIGS. 5-8.

Figure 5:
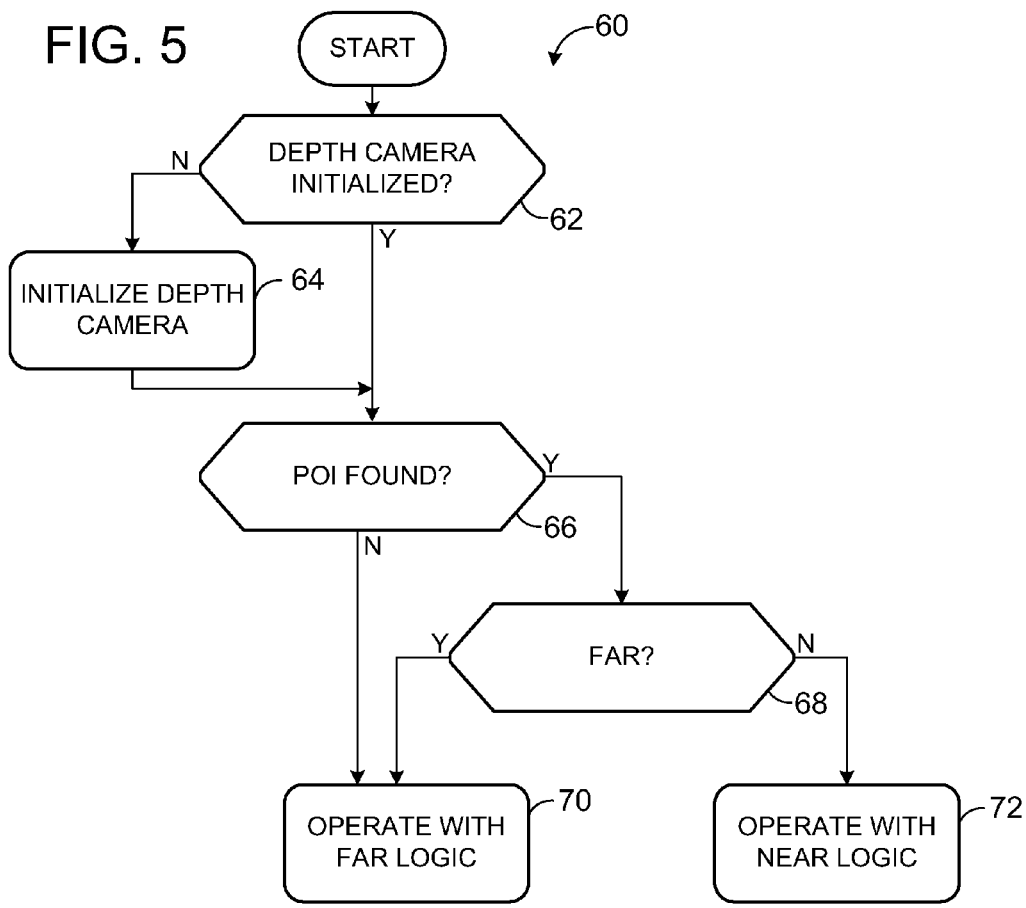
FIG. 5 shows a flow diagram of an example method of deciding whether a depth camera is to be operated using far logic or near logic.

FIG. 5 shows a method 60 of deciding whether a depth camera is to be operated using far logic or near logic. Method 60 may be used in conjunction with method 50 of FIG. 4.

At 62, method 60 includes determining if a depth camera is initialized. Such a determination may include determining if a relative position and/or orientation of the depth camera is known.

At 64, method 60 includes initializing the depth camera if the depth camera is not currently initialized. As an example, the relative height of the depth camera above the floor may be a parameter that is considered when making subsequent aiming decisions. As such, initializing the depth camera may include determining the relative height of the depth camera above the floor. In some embodiments, this may be accomplished, at least in part, by analyzing one or more depth images of a scene with a floor-finding algorithm to locate the floor within the scene. In other words, a floor surface may be found within the scene and a height of the depth camera above the floor surface may be calculated using depth information from the depth camera. Any suitable floor finding algorithm may be used without departing from the scope of this disclosure. As one nonlimiting example, a plurality of rows of a depth image may be scanned in screen space, and a straight depth line may be interpolated through the deepest observed points on the left and right sides of the image for each row. A pair of straight boundary lines may then be fit to the endpoints of the straight depth lines, and a floor plane may be defined to include these straight boundary lines. In some embodiments, a user may manually input the position of the depth camera. Other methods of initializing the depth camera may be used without departing from the scope of this disclosure.

At 66, method 60 includes determining if a point of interest is within the scene. As a nonlimiting example, if the head of a player target is the point of interest for a particular application, the scene can be examined to determine if the head of a player target is visible within the scene. This may be accomplished via any suitable image analysis and/or modeling technique without departing from the scope of this disclosure. As one nonlimiting example, each pixel of an observed depth image may be labeled as either a foreground pixel belonging to the target or a background pixel not belonging to the target. Each foreground pixel may then be labeled with body part information indicating a likelihood that that foreground pixel belongs to one or more body parts of the target. The target may then be modeled with a skeleton including a plurality of skeletal points, each skeletal point including a three dimensional position derived from body part information of one or more foreground pixels. It may then be determined if the point of interest (e.g., the head) is in view and modeled by the skeleton.

At 68, method 60 includes determining if the point of interest is within a far range relative to the depth camera or if the point of interest is within a near range relative to the camera. The parameters of the near range and the far range may be set based on a variety of different considerations, including the field of view of the depth camera. In one embodiment, the near range is set as 0 to 2.0 horizontal meters away from the depth camera, and the far range is anything farther than 2.0 horizontal meters away from the depth camera.

Figure 6:
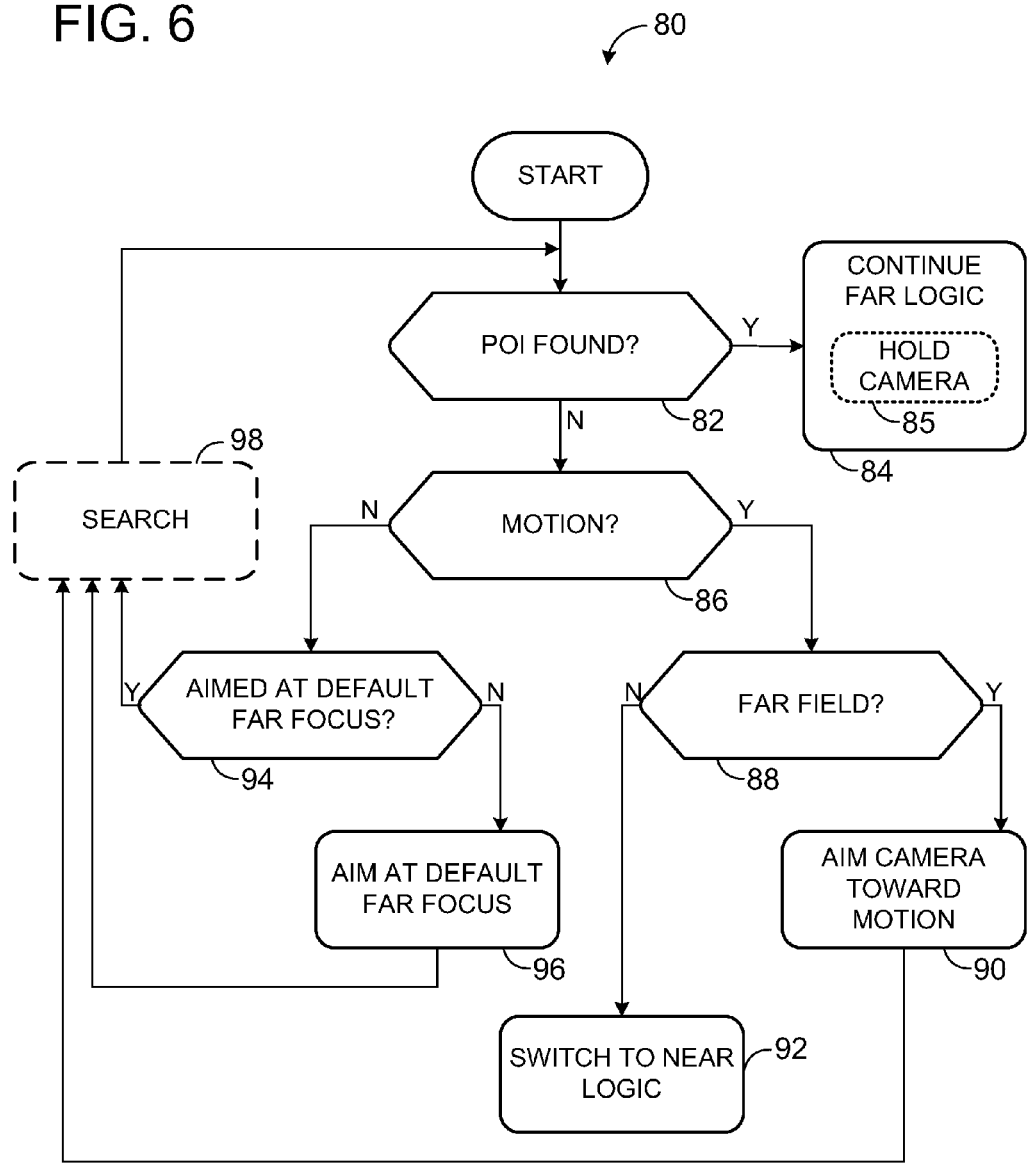
FIG. 6 shows a flow diagram of an example method of implementing far logic in accordance with an embodiment of the present disclosure.

At 70, if the point of interest of the target is within the far range, the depth camera is operated with a far logic, as described by way of example with reference to FIG. 6. At 72, if the point of interest of the target is not within the far range, the depth camera is operated with a near logic, as described by way of example with reference to FIG. 7. Furthermore, if the point of interest cannot be found within a scene, the depth camera may be operated with the far logic.

As mentioned above, method 60 may be used in conjunction with method 50 of FIG. 4. In particular, as described below, the near logic and the far logic can be used to determine how a camera is moved to find a point of interest when a point of interest cannot be found or becomes lost.

FIG. 6 shows a nonlimiting example method 80 of implementing far logic in accordance with an embodiment of the present disclosure. Method 80 may be used in conjunction with method 50 of FIG. 4 and/or method 60 of FIG. 5.

At 82, method 80 includes determining if a point of interest of a target is found within the scene. At 84, if the point of interest is found within the scene, method 80 may include continuing to operate with the far logic. As indicated at 85, this may include holding the depth camera so that the aiming vector does not move if the point of interest of the target is within the scene at the current aiming vector, as described above with reference to 54 of FIG. 4.

At 86, if a point of interest of the target is not within the scene at a current aiming vector, method 80 includes determining if there is any motion within the scene (e.g., the depth values of pixels are changing from frame to frame as the target moves relative to a static background). At 88, if there is motion within the scene, method 80 includes determining if the motion is in the far field (e.g., the target pixels are within the far field). At 90, if the motion is within the far field, method 80 includes aiming the depth camera so that an aiming vector of the depth camera points towards detected motion in the scene. In this way, a player target that is near the edge of the field of view of the depth camera can be shifted towards a center of the field of view, thus providing the depth camera with a good opportunity to find the point of interest.

At 92, if the motion is not within the far field (e.g., the target pixels are within the near field), method 80 includes switching to the near logic, as described with reference to FIG. 7 below. Such a scenario may occur if a player target moves from the far field to the near field, for example.

If the point of interest cannot be found at 82 and no motion is detected in the scene at 86, this may indicate that the player target is not in the scene. At 94, method 80 includes determining if the depth camera is aimed at a default far focus. The default far focus may be a three dimensional coordinate vertically measured with reference to the floor and horizontally measured with reference to the depth camera. The default far focus may be selected based on an estimated position of a point of interest at a certain range. For example, if the head of a player target is the point of interest, it can be estimated that the average head will be located 1.5 meters above the floor and that the average player stands 3.0 meters away from the depth camera. As such, the default far focus may be located 3.0 meters away from the depth camera and 1.5 meters above the floor.

Figure 9:
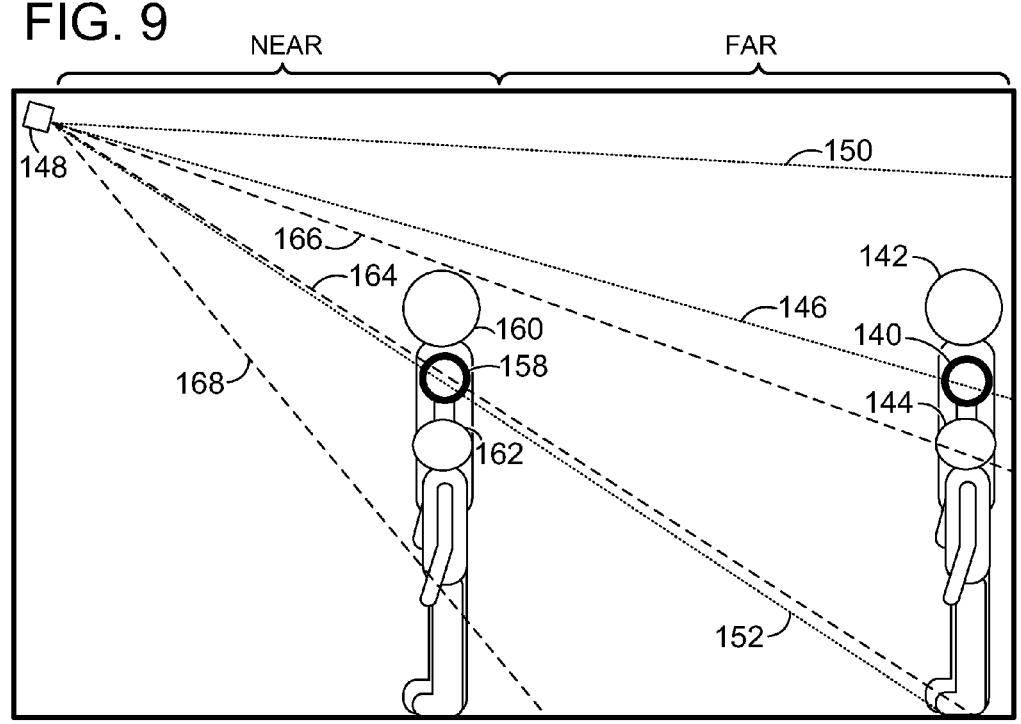
FIG. 9 schematically shows an example default far focus and an example default near focus.

FIG. 9, shows an example default far focus 140. FIG. 9 also shows an example adult player target 142 and an example child player target 144 standing at the same range as the default far focus. As can be seen, the default far focus 140 is below the head of the adult player target 142 and above the head of the child player target 144.

The height of the default far focus above the floor may be set based on an average height of people in a target demographic (e.g., average height of game players between 8 years old and 40 years old). The horizontal distance of the default far focus away from the depth camera can be set based on an estimated play position of players relative to the depth camera and display (e.g., HDTV). For example, if it is estimated that game players usually stand 3.0 meters away from the display and depth camera, the default far focus may be set 3.0 horizontal meters away from the depth camera.

The examples provided above are not limiting. It should be understood that the default far focus can be set at any location. In general, the default far focus may be chosen so as to provide a depth camera with a field of view that is likely to capture the points of interest of player targets that may be different sizes and/or standing in different positions.

In some embodiments, the default far focus may correspond to the height of the depth camera above the floor. That is, the default far focus depends on the height of the depth camera as determined during initialization. In such embodiments, a depth camera at a first height will have a different default far focus than a depth camera at a second height. Such variations may facilitate depth camera aiming along different angles, which depend at least in part on the height of the depth camera.

Returning to FIG. 6, at 96, method 80 includes aiming the depth camera so that an aiming vector of the depth camera points to a default far focus if the point of interest of the target is not within the scene at a current aiming vector. As described above, the default far focus is selected to improve the odds of the depth camera including a point of interest within its field of view. As such, moving the camera to the default far focus may increase the likelihood that a point of interest will be found.

Figure 10A:
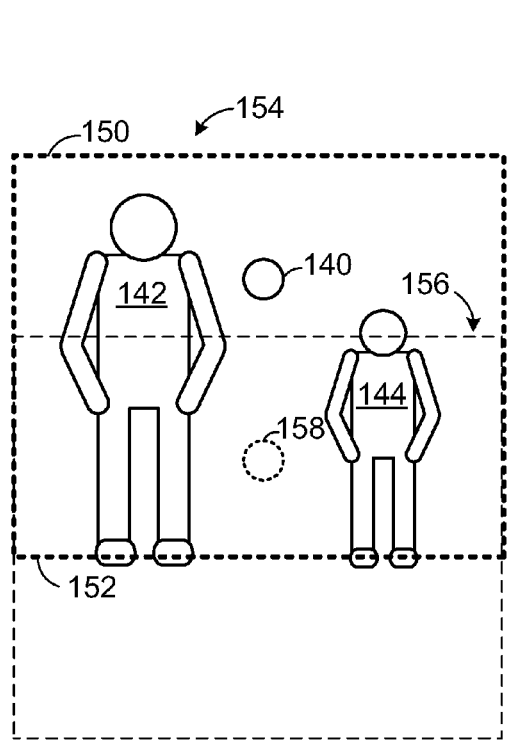
FIG. 10A schematically shows example views of the depth camera of FIG. 9.

FIG. 9 shows an aiming vector 146 of depth camera 148 when the aiming vector points to default far focus 140. FIG. 9 also shows an upper limit 150 and a lower limit 152 of the field of view of depth camera 148. FIG. 10A somewhat schematically shows the view 154 depth camera 148 has of child player target 144 and adult player target 142 when the aiming vector of the depth camera is pointed to the default far focus 140. As a point of comparison, FIG. 10A also shows the view 156 depth camera 148 has of child player target 144 and adult player target 142 when the aiming vector of the depth camera is pointed to a default near focus 158.

Returning to FIG. 6, as indicated at 98, method 80 may optionally include performing one or more search routines in which the aiming vector of the depth camera is changed. Search routines may be performed, for example, when other attempts to find a point of interest fail a predetermined number of iterations. For example, if the logic of FIG. 6 has twice looped back to 82, and a point of interest cannot be found, a search routine may be performed in which the aiming vector of the depth camera is scanned.

Figure 7:
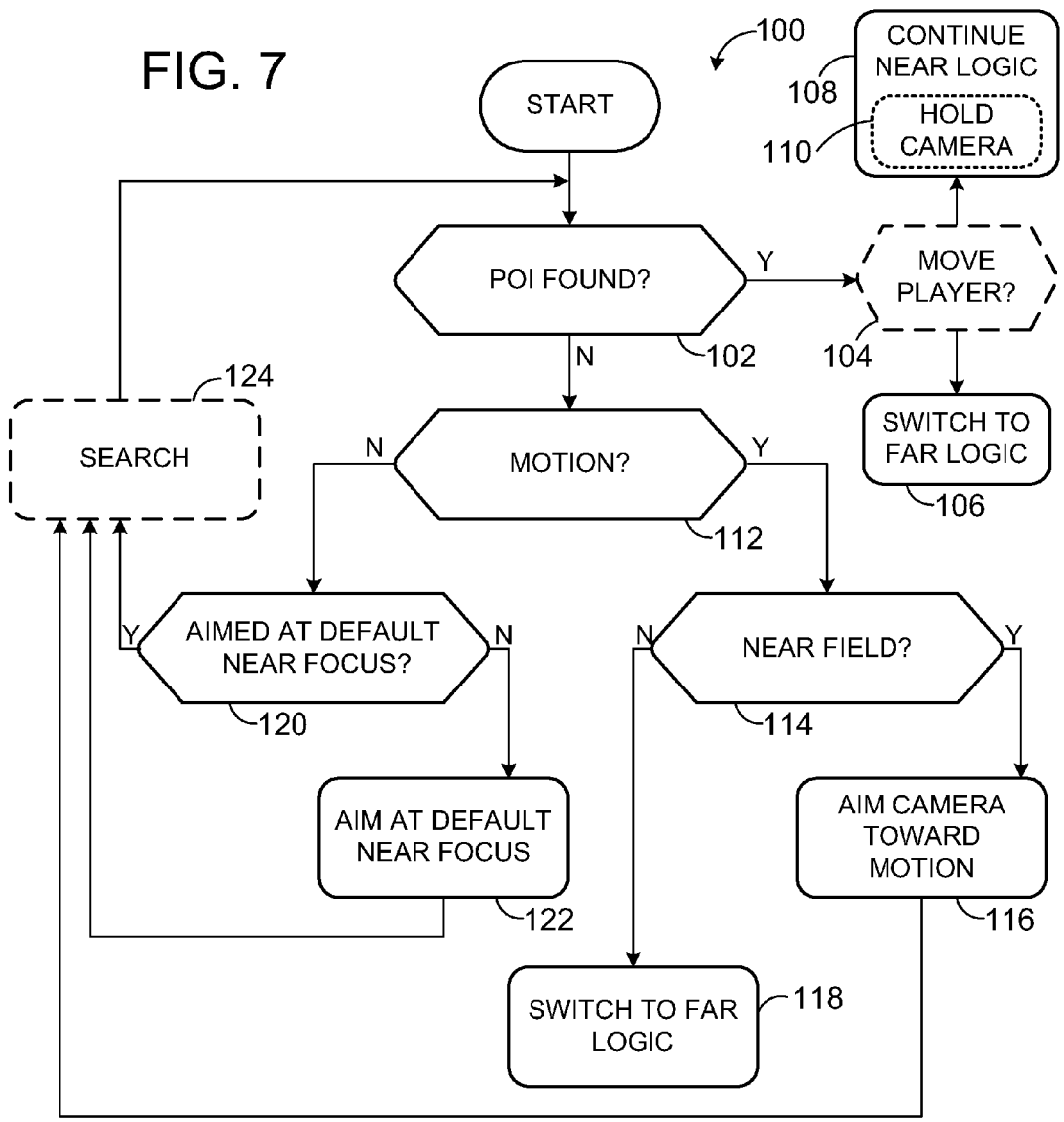
FIG. 7 shows a flow diagram of an example method of implementing near logic in accordance with an embodiment of the present disclosure.

Turning now to FIG. 7, FIG. 7 shows a nonlimiting example method 100 of implementing near logic in accordance with an embodiment of the present disclosure. Method 100 may be used in conjunction with method 50 of FIG. 4, method 60 of FIG. 5, and/or method 80 of FIG. 6.

At 102, method 100 includes determining if a point of interest of a target is found within the scene. At 104, if the point of interest is found within the scene, method 100 may include exploring a move target option as discussed below with reference to FIG. 8. It may be beneficial to move the target from the near field to the far field because the depth camera has a larger field of view at a farther range, thus decreasing the likelihood that a point of interest will move outside of the field of view.

Figure 8:
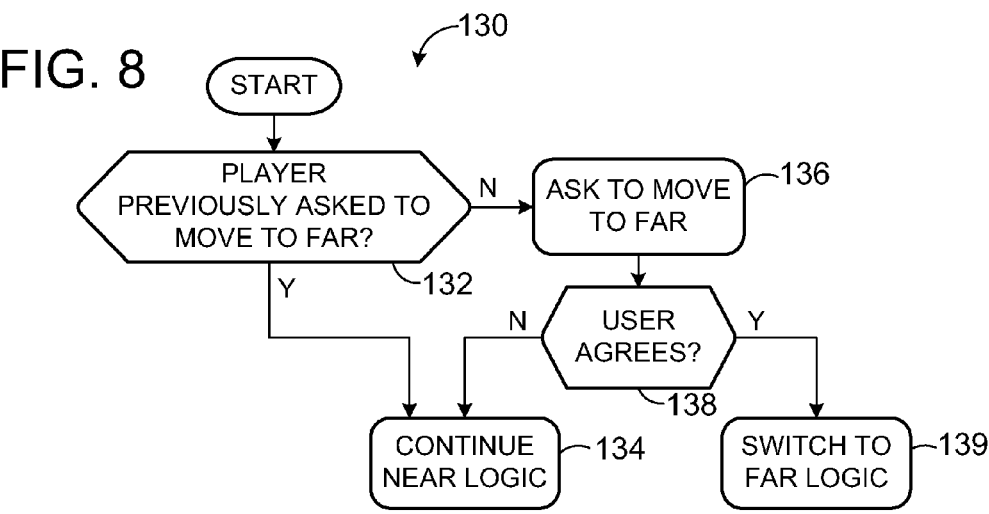
FIG. 8 shows a flow diagram of an example method of executing a move player option.

FIG. 8 shows an example method 130 of executing a move player option. At 132, method 130 includes determining if a player target has previously been asked to move from the near field to the far field. If the player has previously been asked to move from the near field to the far field, the near logic continues to be implemented, as indicated at 134. However, if the player has not been asked to move from the near field to the far field, the player is asked to move from the near field to the far field via a user message, as indicated at 136. If it is determined at 138 that the user agrees and moves to the far field, the far field logic is implemented, as indicated at 139. On the other hand, if it is determined at 138 that the user does not agree to move to the far field and remains in the near field, the near logic continues to be implemented, as indicated at 134.

Returning to FIG. 7, at 106, if the target moves from the near field to the far field, method 100 includes switching to the far logic. At 108, if the target does not move from the near field to the far field, method 100 includes continuing with the near logic. As indicated at 110, this may include holding the depth camera so that the aiming vector does not move if the point of interest of the target is within the scene at the current aiming vector, as described above with reference to 54 of FIG. 4.

At 112, if a point of interest of the target is not within the scene at a current aiming vector, method 100 includes determining if there is any motion within the scene (e.g., the depth values of pixels are changing from frame to frame as the target moves relative to a static background). At 114, if there is motion within the scene, method 100 includes determining if the motion is in the near field (e.g., the target pixels are within the near field). At 116, if the motion is within the near field, method 100 includes aiming the depth camera so that an aiming vector of the depth camera points towards detected motion in the scene. In this way, a player target that is near the edge of the field of view of the depth camera can be shifted towards a center of the field of view, thus providing the depth camera with a good opportunity to find the point of interest.

At 118, if the motion is not within the near field (e.g., the target pixels are within the far field), method 100 includes switching to the far logic, as described with reference to FIG. 6 above. Such a scenario may occur if a player target moves from the near field to the far field, for example.

If the point of interest cannot be found at 102 and no motion is detected in the scene at 112, this may indicate that the player target is not in the scene. At 120, method 100 includes determining if the depth camera is aimed at a default near focus. Similar to the default far focus, the default near focus may be a three dimensional coordinate vertically measured with reference to the floor and horizontally measured with reference to the depth camera. The default near focus may be selected based on an estimated position of a point of interest at a certain range.

FIG. 9, shows an example default near focus 158. FIG. 9 also shows an example adult player target 160 and an example child player target 162 standing at the same range as the default near focus. As can be seen, the default near focus 158 is below the head of the adult player target 160 and above the head of the child player target 162.

Like the default far focus, the default near focus can be set at any location. In general, the default near focus may be chosen so as to provide a depth camera with a field of view that is likely to capture the points of interest of player targets that may be different sizes and/or standing in different positions when those player targets are relatively near the depth camera. Further, like the default far focus, the default near focus may correspond to the height of the depth camera above the floor.

Returning to FIG. 7, at 122, method 100 includes aiming the depth camera so that an aiming vector of the depth camera points to a default near focus if the point of interest of the target is not within the scene at a current aiming vector.

Figure 10B:
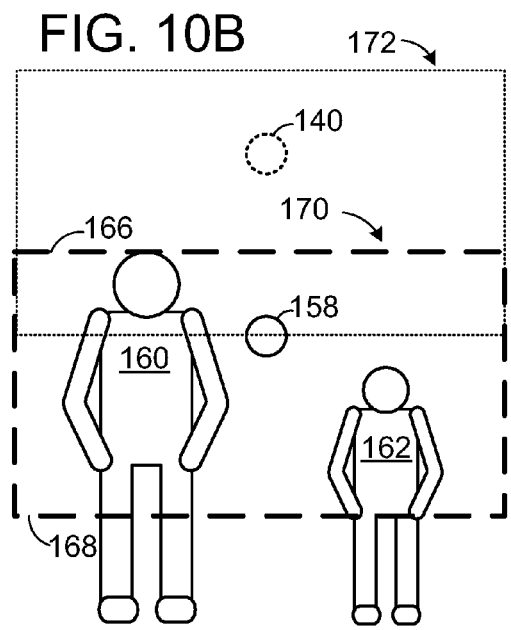
FIG. 10B schematically shows other example views of the depth camera of FIG. 9.

FIG. 9 shows an aiming vector 164 of depth camera 148 when the aiming vector points to default near focus 158. FIG. 9 also shows an upper limit 166 and a lower limit 168 of the field of view of depth camera 148. FIG. 10B somewhat schematically shows the view 170 depth camera 148 has of child player target 162 and adult player target 160 when the aiming vector of the depth camera is pointed to the default near focus 158. As a point of comparison, FIG. 10B also shows the view 172 depth camera 148 has of child player target 162 and adult player target 160 when the aiming vector of the depth camera is pointed to a default far focus 140.

Returning to FIG. 7, as indicated at 124, method 100 may optionally include performing one or more search routines in which the aiming vector of the depth camera is changed. Search routines may be performed, for example, when other attempts to find a point of interest fail a predetermined number of iterations. For example, if the logic of FIG. 7 has twice looped back to 102, and a point of interest cannot be found, a search routine may be performed in which the aiming vector of the depth camera is scanned. In some embodiments, the search routine may include switching from near logic to far logic if the point of interest cannot be found with the near logic.

Figure 11:
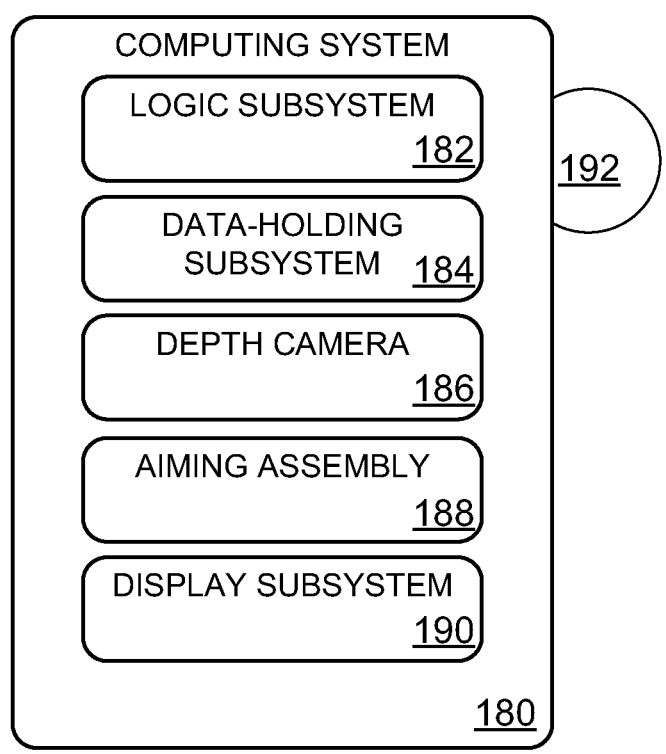
FIG. 11 shows a block diagram of an example computing system in accordance with embodiments of the present disclosure.

The methods and processes described herein may be tied to a variety of different types of computing systems. FIGS. 1A and 1B show a nonlimiting example in the form of gaming system 12, HDTV 16, and depth camera 20. As another, more general, example, FIG. 11 schematically shows a computing system 180 that may perform of the above described methods and processes. Computing system 180 may take a variety of different forms, including, but not limited to, gaming consoles, personal computing systems, public computing systems, human-interactive robots, military tracking and/or targeting systems, and character acquisition systems offering green-screen or motion-capture functionality, among others.

Computing system 180 includes a logic subsystem 182, a data-holding subsystem 184, a depth camera 186, and an aiming assembly 188. Computing system 180 may optionally include a display subsystem 190 and/or other components not shown in FIG. 11.

Logic subsystem 182 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 184 may include one or more physical, non-transitory, devices configured to hold data and/or instructions executable by the logic subsystem to implement the herein described methods and processes. When such methods and processes are implemented, the state of data-holding subsystem 184 may be transformed (e.g., to hold different data). Data-holding subsystem 184 may include removable media and/or built-in devices. Data-holding subsystem 184 may include optical memory devices, semiconductor memory devices, and/or magnetic memory devices, among others. Data-holding subsystem 184 may include devices with one or more of the following characteristics: volatile, nonvolatile, dynamic, static, read/write, read-only, random access, sequential access, location addressable, file addressable, and content addressable. In some embodiments, logic subsystem 182 and data-holding subsystem 184 may be integrated into one or more common devices, such as an application specific integrated circuit or a system on a chip.

FIG. 11 also shows an aspect of the data-holding subsystem in the form of computer-readable removable media 192, which may be used to store and/or transfer data and/or instructions executable to implement the herein described methods and processes.

When included, display subsystem 190 may be used to present a visual representation of data held by data-holding subsystem 184. As the herein described methods and processes change the data held by the data-holding subsystem, and thus transform the state of the data-holding subsystem, the state of display subsystem 190 may likewise be transformed to visually represent changes in the underlying data. Display subsystem 190 may include one or more display devices utilizing virtually any type of technology. Such display devices may be combined with logic subsystem 182 and/or data-holding subsystem 184 in a shared enclosure, or such display devices may be peripheral display devices.

Computing system 180 further includes a depth camera 186 configured to obtain depth images of one or more targets. Depth camera 186 may be configured to capture video with depth information via any suitable technique (e.g., time-of-flight, structured light, stereo image, etc.).

For example, in time-of-flight analysis, the depth camera 186 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the depth camera to a particular location on the target. In some cases, the phase of the outgoing light wave may be compared to the phase of the incoming light wave to determine a phase shift, and the phase shift may be used to determine a physical distance from the depth camera to a particular location on the target.

In another example, time-of-flight analysis may be used to indirectly determine a physical distance from the depth camera to a particular location on the target by analyzing the intensity of the reflected beam of light over time, via a technique such as shuttered light pulse imaging.

In another example, structured light analysis may be utilized by depth camera 186 to capture depth information. In such an analysis, patterned light (i.e., light displayed as a known pattern such as grid pattern, a stripe pattern, a constellation of dots, etc.) may be projected onto the target. Upon striking the surface of the target, the pattern may become deformed, and this deformation of the pattern may be studied to determine a physical distance from the depth camera to a particular location on the target.

In another example, the depth camera may include two or more physically separated cameras that view a target from different angles to obtain visual stereo data. In such cases, the visual stereo data may be resolved to generate a depth image.

In other embodiments, depth camera 186 may utilize other technologies to measure and/or calculate depth values. Additionally, depth camera 186 may organize the calculated depth information into "Z layers," i.e., layers perpendicular to a Z axis extending from the depth camera along its line of sight to the viewer.

In some embodiments, two or more different cameras may be incorporated into an integrated depth camera. For example, a depth camera and a video camera (e.g., RGB video camera) may be incorporated into a common depth camera. In some embodiments, two or more separate depth cameras may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

Aiming assembly 188 is configured to selectively change an aiming vector of the depth camera. The aiming assembly may include one or more machines that physically move the camera. In different embodiments, the aiming assembly may be configured to change the up/down pitch, left/right yaw, clockwise/counter-clockwise roll, up/down lift, and/or left/right translation of the camera. As nonlimiting examples, the aiming assembly may include a one to three axis gimbal with or without an up/down lift and/or a right/left slide.

The aiming assembly may include various motors, gears, lifts, slides, and other components that are used to change the aiming vector of the depth camera. The aiming methods described herein may decrease the need to repeatedly use such components. As such, physical wear and tear to bearings, wires, gears, motors, and other components may be decreased. By decreasing wear on the various components of the aiming assembly, the business value of the depth capture system is increased, because the life of the system may be increased and/or the maintenance costs of the system may be decreased.

It is to be understood that at least some target analysis and tracking operations may be executed by a logic machine of one or more depth cameras. A depth camera may include one or more onboard processing units configured to perform one or more target analysis and/or tracking functions. A depth camera may include firmware to facilitate updating such onboard processing logic.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system, comprising:
   a depth camera configured to capture depth information for targets in a field of view of the depth camera;
   an aiming assembly configured to dynamically and repeatedly change the field of view of the depth camera by physically changing one or both of a pitch and a yaw of the depth camera to change an aiming vector of the depth camera while the depth camera images a scene;
   a logic subsystem in operative communication with the depth camera and the aiming assembly; and
   a data-holding subsystem holding instructions executable by the logic subsystem to:
      receive from the depth camera one or more observed depth images including a plurality of pixels, each such pixel including a depth value indicating a distance to a surface in the scene imaged by that pixel;
      instruct the aiming assembly to automatically change the field of view of the depth camera by physically changing one or both of the pitch and the yaw of the depth camera while the depth camera images the scene so that the aiming vector points with a first predetermined pitch to a predetermined default far focus if a target is within a far range; and
      instruct the aiming assembly to automatically change the field of view of the depth camera by physically changing one or both of the pitch and the yaw of the depth camera while the depth camera images the scene so that the aiming vector points with a second predetermined pitch, different than the first predetermined pitch, to a predetermined default near focus, relatively closer to the depth camera than the predetermined default far focus, if the target is within a near range, relatively closer to the depth camera than the far range.

2. The computing system of claim 1, wherein the data-holding subsystem further holds instructions executable by the logic subsystem to instruct the aiming assembly to hold the depth camera so that the aiming vector does not move if a point of interest of the target is within the scene.

3. The computing system of claim 1, wherein the instructions instruct the aiming assembly to aim the depth camera so that the aiming vector points to the default far focus if the target is within the far range and a point of interest of the target is not within the scene at a current aiming vector, and wherein the instructions instruct the aiming assembly to hold the depth camera so that the aiming vector does not move if the point of interest of the target is within the scene at the current aiming vector.

4. The computing system of claim 1, wherein the instructions instruct the aiming assembly to aim the depth camera so that the aiming vector points to the predetermined default near focus if the target is within the near range and a point of interest of the target is not within the scene at a current aiming vector, and wherein the instructions instruct the aiming assembly to hold the depth camera so that the aiming vector does not move if the point of interest of the target is within the scene at the current aiming vector.

5. The computing system of claim 1, wherein the data-holding subsystem further holds instructions executable by the logic subsystem to instruct the aiming assembly to aim the depth camera so that the aiming vector points towards detected motion in the scene if a point of interest of the target is not within the scene.

6. The computing system of claim 1, wherein the data-holding subsystem further holds instructions executable by the logic subsystem to output a user message requesting the target to move from the near range to the far range if the target is within the near range.

7. The computing system of claim 1, wherein the data-holding subsystem further holds instructions executable by the logic subsystem to initialize a position of the depth camera.

8. The computing system of claim 7, wherein the position of the depth camera is initialized by finding a floor surface within the scene and calculating a height of the depth camera above the floor surface.

9. The computing system of claim 8, wherein the data-holding subsystem further holds instructions executable by the logic subsystem to calculate a position of the predetermined default far focus to be a predetermined distance above the floor surface at a predetermined distance away from the depth camera.

10. The computing system of claim 8, wherein the data-holding subsystem further holds instructions executable by the logic subsystem to calculate a position of the predetermined default near focus to be a predetermined distance above the floor surface at a predetermined distance away from the depth camera.

11. A method of automatically aiming a field of view of a depth camera at a point of interest, the method comprising:
   receiving from the depth camera one or more observed depth images of a scene including a plurality of pixels, each such pixel including a depth value indicating a distance to a surface in the scene imaged by that pixel;
   if a point of interest of a target is found within the scene while the depth camera images the scene with a first predetermined pitch having an aiming vector that points to a predetermined default far focus, determining if the point of interest is within a far range relative to a distance from the depth camera; and
   if the point of interest of the target is within the far range, operating the depth camera with a far logic; and
   if the point of interest of the target is not within the far range, automatically and dynamically adjusting the field of view of the depth camera relative to the scene by physically changing a pitch of the depth camera to a second predetermined pitch so that the aiming vector changes from pointing to the predetermined default far focus to pointing to a predetermined default near focus to image targets closer to the depth camera; and operating the depth camera with a near logic.

12. The method of claim 11, wherein operating the depth camera with the far logic includes aiming the depth camera so that an aiming vector of the depth camera points to a default far focus if the point of interest of the target is not within the scene at a current aiming vector, and holding the depth camera so that the aiming vector does not move if the point of interest of the target is within the scene at the current aiming vector.

13. The method of claim 11, wherein operating the depth camera with the near logic includes aiming the depth camera so that an aiming vector of the depth camera points to a default near focus if the point of interest of the target is not within the scene at a current aiming vector, and holding the depth camera so that the aiming vector does not move if the point of interest of the target is within the scene at the current aiming vector.

14. The method of claim 11, wherein operating the depth camera with the far logic includes aiming the depth camera so that an aiming vector of the depth camera points towards detected motion in the scene if the point of interest of the target is not within the scene at a current aiming vector, and holding the depth camera so that the aiming vector does not move if the point of interest of the target is within the scene at the current aiming vector.

15. The method of claim 11, wherein operating the depth camera with the near logic includes aiming the depth camera so that an aiming vector of the depth camera points towards detected motion in the scene if the point of interest of the target is not within the scene at a current aiming vector, and holding the depth camera so that the aiming vector does not move if the point of interest of the target is within the scene at the current aiming vector.

16. The method of claim 11, further comprising initializing a position of the depth camera.

17. The method of claim 16, wherein initializing the position of the depth camera includes finding a floor surface within the scene and calculating a height of the depth camera above the floor surface.

18. The method of claim 17, further comprising calculating a position of a default far focus to be a predetermined distance above the floor surface at a predetermined distance away from the depth camera.

19. The method of claim 17, further comprising calculating a position of a default near focus to be a predetermined distance above the floor surface at a predetermined distance away from the depth camera.

* * * * *